(12) United States Patent
Song et al.

(10) Patent No.: US 8,526,608 B2
(45) Date of Patent: *Sep. 3, 2013

(54) PRINTING SYSTEM AND PRINTER WITH ELECTRONIC SIGNATURE CAPABILITY AND METHOD THEREOF

(75) Inventors: Eun-ah Song, Suwon-si (KR); Hyun-sun Jung, Suwon-si (KR); Yong-geun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

This patent is subject to a terminal disclaimer.

(21) Appl. No.: 13/064,177

(22) Filed: Mar. 9, 2011

(65) Prior Publication Data

US 2011/0164289 A1 Jul. 7, 2011

Related U.S. Application Data

(63) Continuation of application No. 11/399,521, filed on Apr. 7, 2006, now Pat. No. 7,929,695.

(30) Foreign Application Priority Data

Jul. 19, 2005 (KR) .............................. 2005-0065504

(51) Int. Cl.
 *G09C 5/00* (2006.01)
 *H04L 9/32* (2006.01)
(52) U.S. Cl.
 USPC ............ 380/55; 726/2; 726/4; 726/9; 726/26; 726/27; 726/28; 726/30; 726/32; 713/165; 713/171; 713/172; 713/176; 713/182; 713/183; 713/192; 713/193; 713/194

(58) Field of Classification Search
 USPC ............................. 380/255, 55; 713/171, 176
 See application file for complete search history.

(56) References Cited

U.S. PATENT DOCUMENTS

| 4,817,034 | A | | 3/1989 | Hardin, Sr. et al. |
|---|---|---|---|---|
| 5,398,289 | A | | 3/1995 | Rourke et al. |
| 5,432,618 | A | * | 7/1995 | Monnot et al. ............... 358/435 |
| 5,434,928 | A | | 7/1995 | Wagner et al. |
| 5,790,662 | A | * | 8/1998 | Valerij et al. ...................... 380/2 |
| 5,825,988 | A | | 10/1998 | Collard et al. |
| 5,892,824 | A | * | 4/1999 | Beatson et al. ............... 713/186 |
| 5,956,409 | A | * | 9/1999 | Chan et al. ...................... 380/54 |
| 6,185,683 | B1 | | 2/2001 | Ginter et al. |
| 6,226,105 | B1 | | 5/2001 | Fukushi |

(Continued)

FOREIGN PATENT DOCUMENTS

JP 2005-173698 6/2005

*Primary Examiner* — Edan Orgad
*Assistant Examiner* — Jenise Jackson
(74) *Attorney, Agent, or Firm* — Roylance, Abrams, Berdo and Goodman, LLP

(57) ABSTRACT

A printing system and printer with an electronic signature capability, and a method thereof are provided. To print security documents using an electronic signature stored in a portable memory, the printing system of the invention includes a portable memory for storing an electronic signature. A memory interface connects detachably to the portable memory. A printer receives the electronic signature from the memory interface, composes the received electronic signature with print data, and executes a print operation. Accordingly, a stamping or signature process on numerous documents can be facilitated, and excessive stamping or signature execution can be prevented. Moreover, the electronic signature of the invention can be executed on various types of forms or documents.

12 Claims, 4 Drawing Sheets

(56) References Cited

U.S. PATENT DOCUMENTS

| | | |
|---|---|---|
| 6,411,784 B1 | 6/2002 | Taniguchi |
| 7,120,798 B2* | 10/2006 | Suisa ............................ 713/176 |
| 7,124,094 B1 | 10/2006 | Kobayashi et al. |
| 7,194,618 B1 | 3/2007 | Suominen |
| 7,194,957 B1 | 3/2007 | Leon et al. |
| 2001/0015818 A1 | 8/2001 | Kawanabe et al. |
| 2002/0042884 A1* | 4/2002 | Wu et al. ....................... 713/201 |
| 2002/0049614 A1* | 4/2002 | Rice et al. ......................... 705/3 |
| 2002/0105666 A1 | 8/2002 | Sesek |
| 2002/0107799 A1* | 8/2002 | Hoshino et al. ................. 705/41 |
| 2002/0129255 A1* | 9/2002 | Tsuchiyama et al. ......... 713/176 |
| 2002/0199117 A1 | 12/2002 | Nagaya |
| 2003/0063744 A1* | 4/2003 | Parry .............................. 380/51 |
| 2003/0101342 A1* | 5/2003 | Hansen ......................... 713/167 |
| 2005/0049977 A1* | 3/2005 | Suisa .............................. 705/71 |
| 2005/0057779 A1 | 3/2005 | Sesek et al. |
| 2005/0108548 A1* | 5/2005 | Ohta ............................ 713/182 |
| 2005/0134896 A1* | 6/2005 | Koga .......................... 358/1.14 |
| 2005/0200638 A1 | 9/2005 | Silverbrook et al. |
| 2005/0240771 A1 | 10/2005 | Ginter et al. |
| 2006/0007490 A1 | 1/2006 | Silverbrook et al. |
| 2006/0098226 A1 | 5/2006 | Morita |
| 2006/0230286 A1* | 10/2006 | Kitada ............................ 713/186 |
| 2006/0250461 A1 | 11/2006 | Silverbrook et al. |
| 2007/0174629 A1 | 7/2007 | Suominen |
| 2008/0259711 A1 | 10/2008 | Shipton et al. |

* cited by examiner

PRINTING SYSTEM AND PRINTER WITH ELECTRONIC SIGNATURE CAPABILITY AND METHOD THEREOF

CROSS-REFERENCE TO RELATED APPLICATIONS

This is a continuation application of U.S. application Ser. No. 11/399,521, filed Apr. 7, 2006 now U.S. Pat. No. 7,929,695, which claims the benefit under 35 U.S.C. §119(a) of Korean Patent Application No. 2005-65504, filed in the Korean Intellectual Property Office on Jul. 19, 2005, the entire contents of which are hereby incorporated by reference.

BACKGROUND OF THE INVENTION

1. Field of the Invention

The present invention relates in general to a printing system and printer with an electronic signature capability. More particularly, the present invention relates to a printing system and printer with an electronic signature capability for printing security documents by using an electronic signature stored in a portable memory, and a method thereof.

2. Description of the Related Art

For documents, such as, legal agreements or commercial (business) transactions, manual signatures or stamped imprints are still broadly used. To facilitate work, sometimes a third party, such as a deputy, acting on behalf of a person authorized to execute signatures or stamp imprints, provides a seal or stamp of the authorized person to numerous documents. Unfortunately, excessive use of a seal or stamp to documents causes security problems if the deputy uses the seal or stamp recklessly.

On the other hand, most stamped imprints or seals are usually standardized for a specific type of form or document. Therefore, the stamped imprints or seals cannot be used for various forms or documents.

Accordingly, there is a need for an improved printing system, printer, and method, with an electronic signature capability, that provides security measures for printing an electronic signature on various types of forms or documents.

SUMMARY OF THE INVENTION

An aspect of embodiments of the present invention is to address at least the above problems and/or disadvantages and to provide at least the advantages described below. Accordingly, an aspect of embodiments of the present invention is to provide a printing system and printer with an electronic signature capability and a method thereof, whereby stamping or executing a signature on numerous documents can be facilitated, and excessive stamping or signature execution can be prevented.

It is another object of an exemplary embodiment of the present invention to provide a printing system and printer with electronic stamp or signature capability to run independently, regardless of the type of form or document used, and a method thereof.

To achieve the above objects and advantages, there is provided a printing system with an electronic signature capability, including a portable memory for storing an electronic signature. A memory interface is connected detachably to the portable memory. A printer receives the electronic signature from the memory interface, composing the received electronic signature with print data, and executing a print operation.

Preferably, the printing system further includes a user interface to which a printing system user inputs the printing attributes of the electronic signature. The printer composes the electronic signature with the print data by applying the printing attributes obtained from the user.

In an exemplary embodiment of the present invention, the portable memory stores a password and the electronic signature encrypted with the password. The user interface obtains the password from the user. The printer compares the password received from the memory interface to the password input from the user interface, and composes the electronic signature with the print data and executes a print operation, if the passwords are alike.

Another aspect of an exemplary embodiment of the present invention provides printer with an electronic signature capability, including a memory interface connected detachably to a portable memory storing an electronic signature. A composition unit receives the electronic signature from the memory interface, and composes the received electronic signature with print data. A printing unit prints the print data bearing the electronic signature.

Preferably, the printer further includes a user interface in which a printer user inputs the printing attributes of the electronic signature. The composition unit composes the electronic signature with the print data by applying the printing attributes obtained from the user.

In an exemplary embodiment of the present invention, the portable memory stores a password and the electronic signature encrypted with the password. The user interface obtains the password from the user. The composition unit compares the password received from the memory interface to the password input from the user interface, and composes the electronic signature with the print data if the passwords are alike.

Still another aspect of an exemplary embodiment of the present invention provides an electronic signature printing method, including storing an electronic signature in a portable memory. The electronic signature is received from the portable memory, the electronic signature with print data is composed, and a print operation is executed.

Preferably, the method further includes obtaining the printing attributes of the electronic signature from the user. The composition of the electronic signature to the print data is executed by applying the printing attributes provided from the user, in the receiving of the electronic signature from the portable memory.

In an exemplary embodiment of the present invention, a password and the electronic signature encrypted with the password are stored. The password is obtained from the user. The password stored in the portable memory is compared to the password obtained from the user, the electronic signature is composed with the print data, if the passwords are alike, and the electronic signature is printed.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
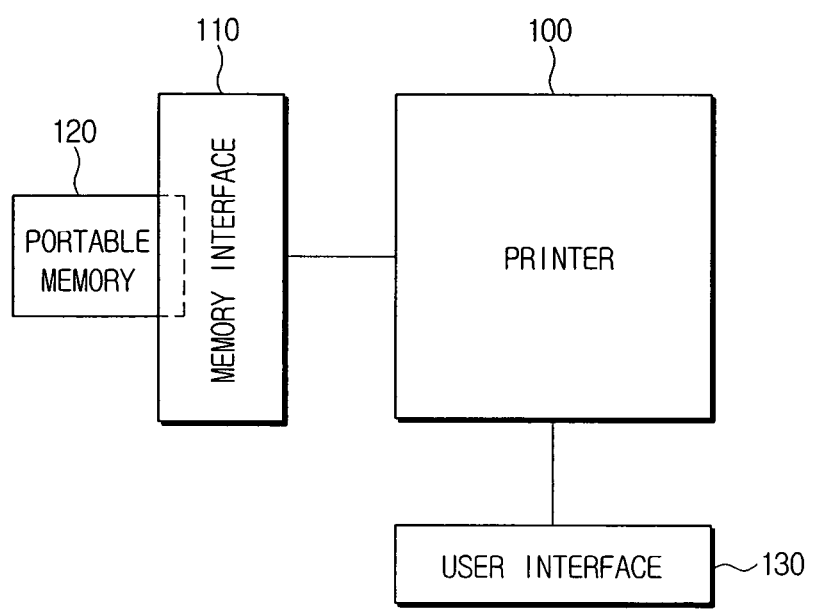
FIG. 1 is a functional block diagram of a printing system according to an exemplary embodiment of the present invention.

FIG. 1 is a functional block diagram of a printing system according to an exemplary embodiment of the present invention. The printing system with an electronic signature capability includes a printer 100, memory interface 110, and portable memory 120. Additionally, the printing system may further include a user interface 130.

The portable memory 120 includes a storage medium with portability, such as, a Universal Serial Bus (USB) memory stick using a USB interface, a ZIP drive, and the like. The portable memory 120 stores an electronic signature that prevents a third party from using the electronic signature without permission from the signature owner (that is, the user). In the event the user may accidentally lose the portable memory 120, encrypting the electronic signature with a password is strongly recommended. As a result, the password is stored together with the electronic signature in the portable memory 120. The electronic signature may be stored in an image file, for example, tagged image file format (TIFF), joint photographic experts group (JPEG), bit-mapped graphics format (BMP), and the like.

The memory interface 110 connects the portable memory 120 detachably to the printer 100. If the USB memory stick is used as the portable memory 120, the USB interface may be used as the memory interface 110. As illustrated in FIG. 1, the memory interface 110 is connected to be able to communicate with the printer 100. To communicate with the printer, the memory may be connected directly to the printer 100, or a host (not shown) of the user, which is connected to the printer 100 over a network, such as, a LAN, Internet, and the like.

The printer 100 receives from the memory interface 110 the electronic signature stored in the portable memory 120. The printer 100 also composes the electronic signature with print data to be printed, and prints out the document bearing the electronic signature.

The user interface 130 receives, from the printing system, user printing attributes that the electronic signature possesses. In other words, the user interface 130 receives from the user information including a size of the electronic signature, position on the document where the electronic signature should be printed, and whether the user wants to print the electronic signature opaquely on the print data or as a watermark image.

Similar to the memory interface 110, the user interface 130 is connected to be able to communicate with the printer 100. Thus, the user interface 130 may also be connected directly in the printer 100, or placed at a host (not shown) of the user, which is connected to the printer 100 over a network.

Figure 4:
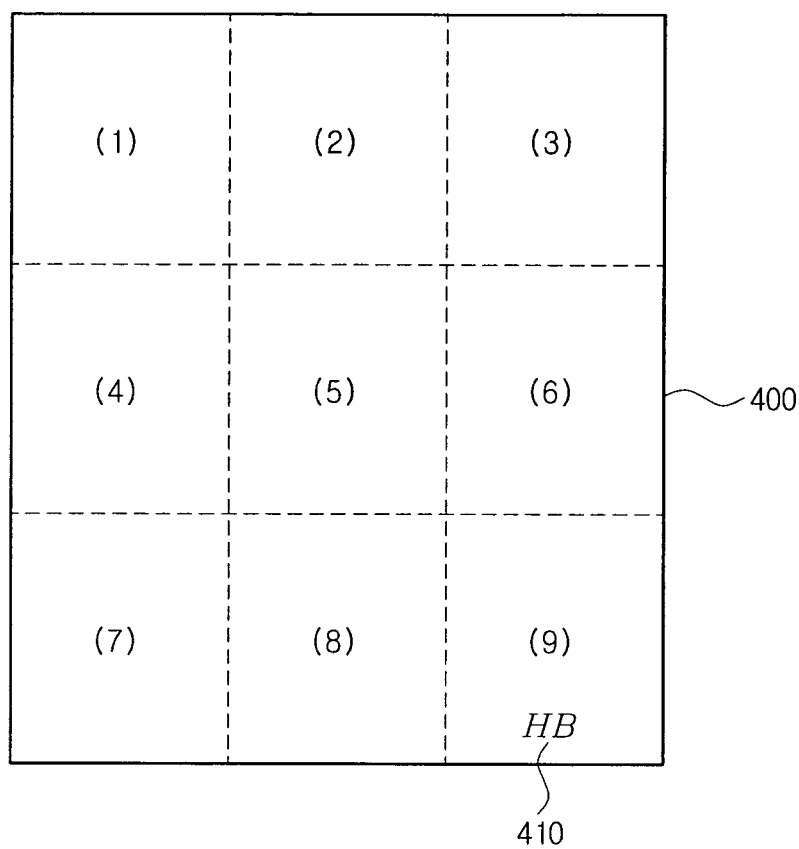
FIG. 4 is a diagram for explaining a method of determining a position for electronic signature composition, according to an exemplary embodiment of the present invention.

FIG. 4 diagrammatically explains a method of determining a position for electronic signature composition, according to an exemplary embodiment of the present invention. For example, the user interface 130 displays to the user a type of document 400 that is split, as shown in FIG. 4, and obtains from the user a preferred position of the electronic signature. When the user inputs a position, for example, position 9, the electronic signature 410 is printed on the document at position 9, as shown in FIG. 4.

In detail, the printer 100 composes the electronic signature with the print data by applying the printing attributes of the electronic signature provided from the user interface 130, and then executes a print operation.

Preferably, the user inputs a password to the user interface 130 to access the electronic signature. As described above, because the electronic signature has been encrypted with a password, and both electronic signature and password are stored in the portable memory 120, the user needs to input the password to decrypt the encrypted electronic signature.

Here, the printer 100 receives the stored password in the portable memory 120 from the memory interface 110. If the stored password received from the memory interface 110 and the password the user input through the user interface 130 are alike, the printer 100 composes the electronic signature stored in the portable memory 120 with the print data to be printed, and executes a print operation.

On the other hand, if the two passwords are not alike, the printer 100 prints the print data and does not print the electronic signature, or does not print the print data at all.

Figure 2:
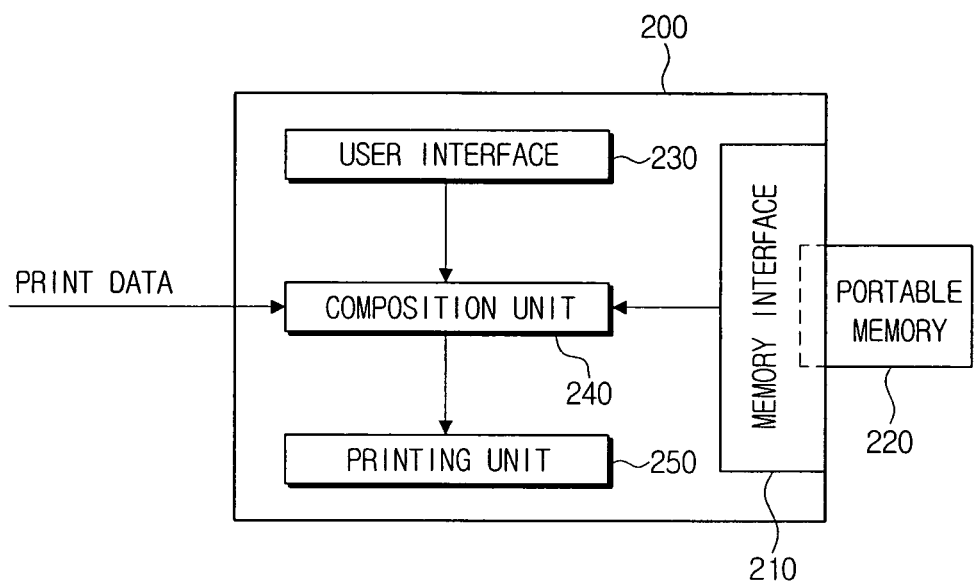
FIG. 2 is a functional block diagram of a printer according to an exemplary embodiment of the present invention.

FIG. 2 is a functional block diagram of a printer according to an exemplary embodiment of the present invention. The printer 200 with an electronic signature capability includes a memory interface 210, composition unit 240, printing unit 250, and portable memory 220. Preferably, the printer 200 may further include a user interface 230.

The portable memory 220 is a storage medium, with portability that stores an electronic signature. The portable memory 220 is attached to the printer 200 when the electronic signature needs to be printed on a document. In this instance, a third party can not use the electronic signature without permission from the signature owner (that is, the user). If the user may accidentally lose the portable memory 220, a recommendation is made for to user to encrypt the electronic signature with a password, and store the password and electronic signature in the portable memory 220.

The memory interface 210 connects the portable memory 220 detachably to the printer 200. When using a USB memory stick as the portable memory 220, a USB interface may be used as the memory interface 210.

The composition unit 240 receives the electronic signature stored in the portable memory 220 from the memory interface 210, and composes the electronic signature with print data.

The printing unit 250 prints the print data bearing the electronic signature.

The user interface 230 obtains printing attributes of the electronic signature from a printer user. Here, the printing attributes of the electronic signature include a size of an electronic signature, position where the electronic signature is to be printed, and whether the user wants to print the electronic signature opaquely on the print data or as a watermark image. At this time, the composition unit 240 composes the electronic signature with the print data using the printing attributes of the electronic signature input by the user interface 230.

Preferably, the user inputs a password to the user interface 230. As described above, since the electronic signature is encrypted with a password, and the electronic signature and password are stored in the portable memory 220 for security purposes, the user needs to input the password to decrypt the encrypted electronic signature.

Here, the composition unit 240 receives the password stored in the portable memory 220 from the memory interface 210. If the password received from the memory interface 210 and the password the user input to the user interface 230 are alike, the composition unit 240 composes the electronic signature stored in the portable memory 220 with the print data to be printed. However, if the two passwords are not alike, the print data and not the electronic signature is printed, or the print data is not printed at all.

Figure 3:
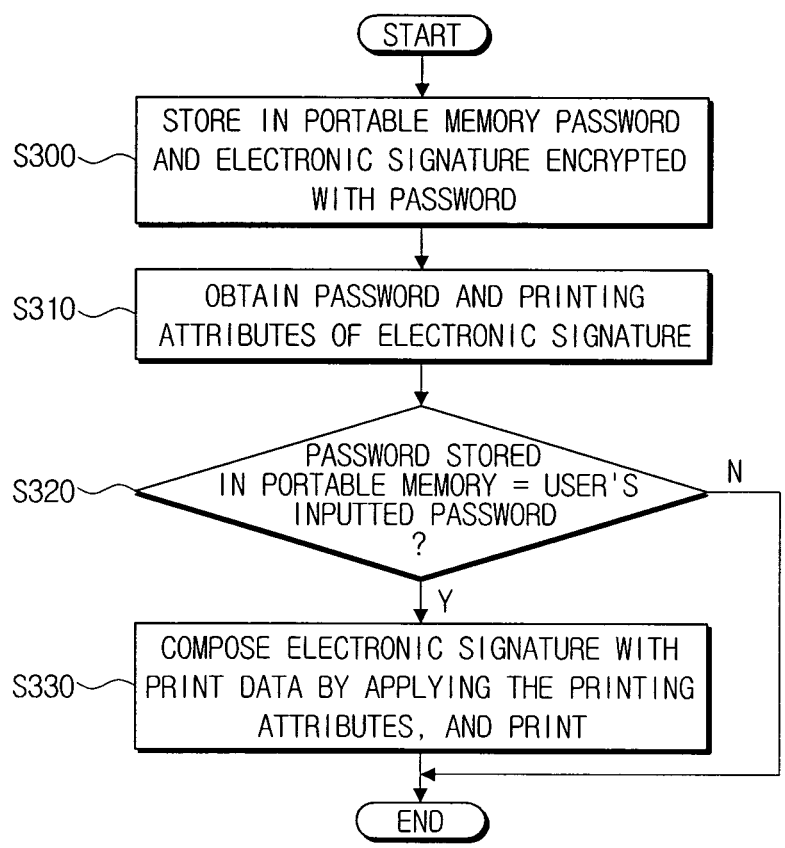
FIG. 3 is a flow chart explaining a printing method according to an exemplary embodiment of the present invention.

FIG. 3 is a flow chart explaining a printing method according to an exemplary embodiment of the present invention.

In step S300, a password and an electronic signature encrypted with the password are stored in the portable memory 120. As explained before, the portable memory 120 is a storage medium with portability, such as, a USB memory stick using USB interface, ZIP drive, and the like. Alternately, the user may store only the electronic signature in the portable memory 120. By using the electronic signature stored in the portable memory 120, a third party using the electronic signature without permission from the user can be prevented. If the user may accidentally lose the portable memory 120, the user is strongly recommended to encrypt the electronic signature with a password, and store the password together with the electronic signature in the portable memory 120 for security purposes. The electronic signature may be stored in an image file, for example, TIFF, JPEG, BMP, and the like. The portable memory 120 may be connected to the printer 100 through the memory interface 110. When using a USB memory stick as the portable memory 120, the USB interface may be used as the memory interface 110. In addition, the portable memory 120 can be connected at the host (not shown) of the printer user.

In step S310, the printer obtains the password and printing attributes of the electronic signature.

The printing attributes of the electronic signature include the size of an electronic signature, position where the electronic signature is to be printed, and whether the user wants to print the electronic signature opaquely on the print data or as a watermark image. Referring to FIG. 4, the printing system displays to the user a type of document 400 that is split, and obtains from the user a preference position of the electronic signature. When the user inputs the position, for example, position 9, the electronic signature 410 is printed on the document at position 9, as shown in FIG. 4.

If the user has encrypted the electronic signature with the password and stored the password in the portable memory 120 in step S300, the printing system requests the user to input the password. As described above, for security purposes, the user inputs the password to decrypt the encrypted electronic signature.

In step S320, the printing system compares the password received from the portable memory 120 to the password obtained in step S310. At this time, the printer 100 receives the password stored in the portable memory 120 from the memory interface 110.

If the two passwords are alike (S320: Y), the printing system receives the electronic signature from the portable memory 120, composes the electronic signature with the print data by applying the printing attributes of the electronic signature obtained in step S310, and executes a print operation (S330).

However, if the two passwords are not alike (S320: N), the print data is not printed, or the print data may be printed without the electronic signature.

According to exemplary embodiments of the present invention, the printing system and printer with an electronic signature capability, and the method thereof, the stamping or signature process on numerous documents can be facilitated. At the same time, excessive stamping or signature execution can be prevented. Moreover, the electronic signature of the exemplary embodiments can be executed on various types of forms or documents.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A printing system with an electronic signature capability, comprising:
    a portable memory for storing an encrypted electronic signature;
    a memory interface to which the portable memory is connected detachably; and
    a printer for receiving the encrypted electronic signature from the memory interface when the portable memory is directly connected to the memory interface and composing the print data with the received electronic signature, and executing a print operation,
    wherein the electronic signature is encrypted with a password, and
    if a user input password and password of the electronic signature match, the printer is configured to decrypt the encrypted electronic signature and compose the print data to be printed with the electronic signature stored in the portable memory, and
    if the user input password and password of the electronic signature do not match, the electronic signature is not printed.

2. The printing system according to claim 1 further comprising:
    a user interface for inputting printing attributes of the electronic signature by a user, and
    wherein the printer is configured to compose the print data with the electronic signature by applying the printing attributes obtained from the user, wherein the printing attributes comprise a size of an electronic signature, position where the electronic signature is to be printed, and whether the user wants to print the electronic signature opaquely on the print data or as a watermark image.

3. The printing system according to claim 2, wherein:
    the portable memory is configured to store the password and the electronic signature encrypted with the password;
    the user interface is configured to allow user input of the password; and
    the printer is configured to compare the password received from the memory interface with the password input in the user interface, and compose the print data with the electronic signature and execute a print operation if the password received from the memory interface and the password input in the user interface match.

4. A printer with an electronic signature capability, comprising:

a memory interface to which a portable memory is connected detachably for storing an encrypted electronic signature;

a composition unit for receiving the encrypted electronic signature from the memory interface when the portable memory is directly connected to the memory interface and composing print data with the received electronic signature; and a printing unit for printing the print data bearing the electronic signature, wherein the electronic signature is encrypted with a password, and if a user input password and password of the electronic signature match, the composition unit is configured to decrypt the encrypted electronic signature and compose the print data to be printed with the electronic signature stored in the portable memory, and if the user input password and password of the electronic signature do not match, the electronic signature is not printed.

5. The printer according to claim 4 further comprising:

a user interface for inputting printing attributes of the electronic signature by a user, and wherein the composition unit is configured to compose the print data with the electronic signature by applying the printing attributes obtained from the user, wherein the printing attributes comprise a size of an electronic signature, position where the electronic signature is to be printed, and whether the user wants to print the electronic signature opaquely on the print data or as a watermark image.

6. The printer according to claim 5, wherein:

the portable memory is configured to store the password and the electronic signature encrypted with the password, and the user interface is configured to obtain the input password from the user; and the composition unit is configured to compare the password received from the memory interface to the password input in the user interface, and compose the print data with the electronic signature if the password received from the memory interface and the password input in the user interface match.

7. An electronic signature printing method, comprising the steps of:

storing an encrypted electronic signature in a portable memory; and controlling a printer for receiving the encrypted electronic signature from the portable memory when the portable memory is directly connected to a memory interface of the printer, composing print data with the electronic signature, and executing a print operation, wherein the electronic signature is encrypted with a password, and wherein the portable memory is detachably connected to the memory interface, and if a user input password and password of the electronic signature match, decrypting the encrypted electronic signature and composing the print data to be printed with the electronic signature stored in the portable memory, and if the user input password and password of the electronic signature do not match, the electronic signature is not printed.

8. The method according to claim 7 further comprising the step of:

obtaining printing attributes of the electronic signature from the user, and performing the composition of the print data with the electronic signature by applying the printing attributes provided from the user, wherein the printing attributes comprise a size of an electronic signature, position where the electronic signature is to be printed, and whether the user wants to print the electronic signature opaquely on the print data or as a watermark image.

9. The method according to claim 8, further comprising the step of:

storing the password and the electronic signature encrypted with the password in the portable memory;

obtaining from the user, the user input password; and comparing the password stored in the portable memory to the input password obtained from the user, composing the print data with the electronic signature if the password stored in the portable memory and the input password obtained from the user match, and printing the print data bearing the electronic signature.

10. The printing system according to claim 1 wherein, if the user input password and password of the electronic signature do not match, the printer is configured to compose the print data to be printed without the electronic signature.

11. The printer according to claim 4 wherein, if the user input password and password of the electronic signature do not match, the printer is configured to compose the print data to be printed without the electronic signature.

12. The method according to claim 7 wherein, if the user input password and password of the electronic signature do not match, the printer is configured to compose the print data to be printed without the electronic signature.

* * * * *